March 26, 1957 A. E. TOBEY 2,786,526
TIRE ABRADING APPARATUS
Filed Oct. 23, 1953 2 Sheets-Sheet 1

INVENTOR
ALTON E. TOBEY
BY
ATTORNEYS

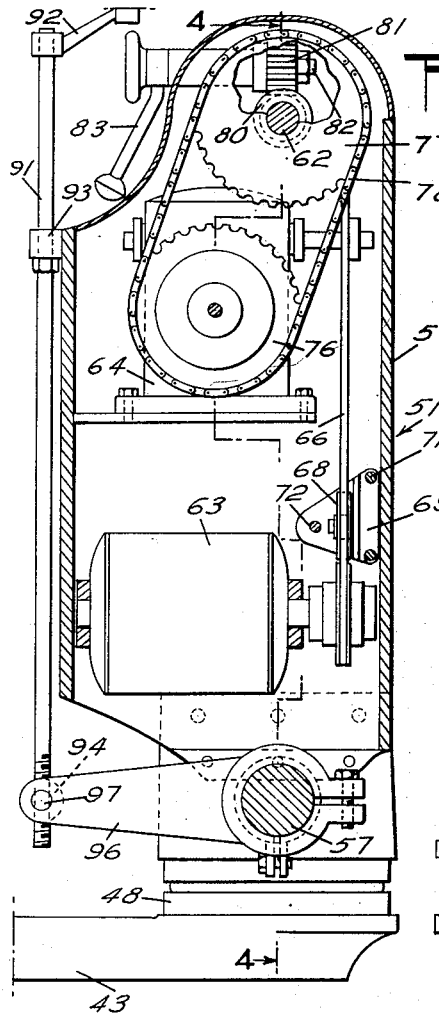
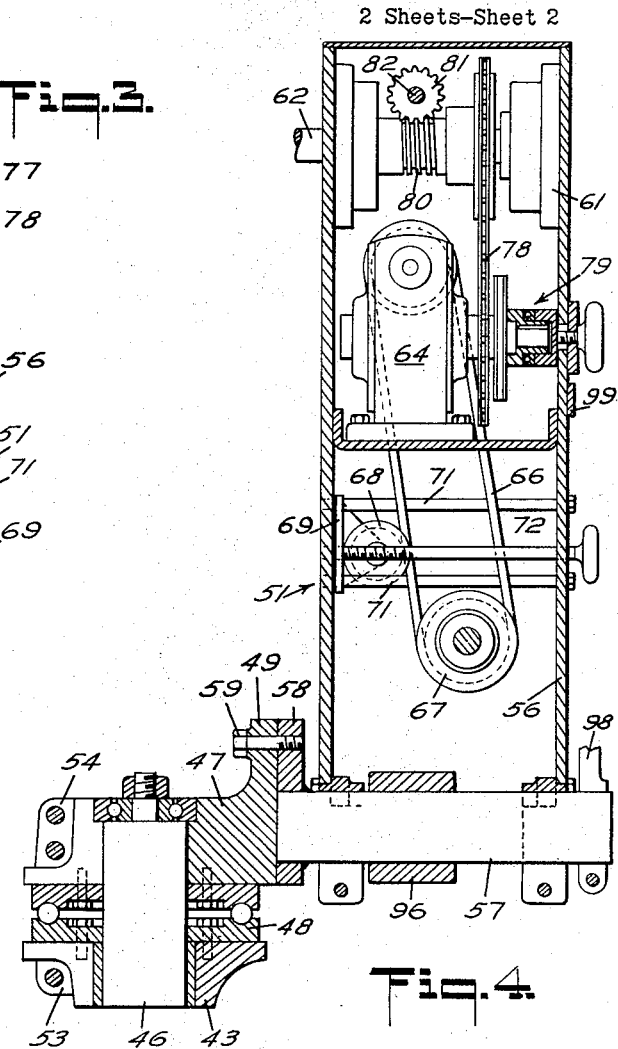
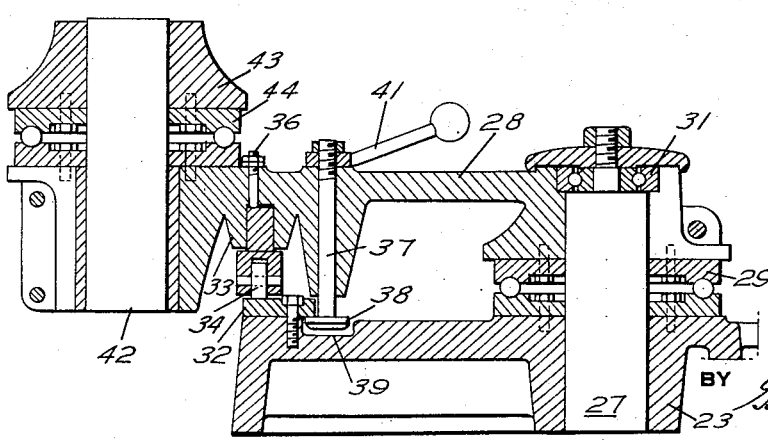

United States Patent Office 2,786,526
Patented Mar. 26, 1957

2,786,526

TIRE ABRADING APPARATUS

Alton E. Tobey, Santa Cruz, Calif.

Application October 23, 1953, Serial No. 387,962

6 Claims. (Cl. 164—10.2)

This invention relates to apparatus utilized in the reconditioning of worn pneumatic tire casings, and more particularly towards mechanism for supporting such tire casings during the buffing or truing operation.

As is well known in the art, one of the steps taken in the recapping or retreading of tire casings comprises the abrasive buffing of the outer peripheral surface of the casing. Conventionally, the tire is brought into contiguous relation with the roughened surface of the buffing wheel which is rotated about a relatively fixed axis effecting an abrading action on the tire periphery. Usually, the buffing wheel drives the tire casing, and as will be understood, the position of the tire with respect to the relatively fixed buffer must be repeatedly changed to insure that all portions of the tire tread as well as portions of the casing side wall will be acted upon by the buffer. Heretofore, shifting of the tire position has been complicated by the nature of the tire supporting mechanisms which do not offer the degree and types of movements desirable in such apparatus. Furthermore, the prior art devices do not readily accommodate themselves to permit the releasable securing of a tire in one position so as to obtain a very limited and accurate abrading action as may be desirable in truing the casing.

According, it is an object of the present invention to provide tire abrading apparatus in which means are provided for rotatably supporting various sizes of tires in an infinite number of positions relative to an axially fixed buffing wheel.

Another object of this invention is to provide apparatus of the character described in which means are provided for independently rotating an abrading wheel and a tire casing at selected speeds so as to insure optimum buffing performance without danger of the tire from jamming the buffer rotation.

A further object of the invention is to provide tire reconditioning apparatus of the type referred to in which the rotatable tire supporting element may be selectively moved about a plurality of vertical axes as well as a horizontal axis, and releasably locked in positions about said axes whereby all peripheral portions of the tire may be brought into position adjacent the buffing apparatus.

A still further object of my invention is to provide mechanism of the above character which is capable of performing rough or fine buffing on the tire periphery.

Another object of this invention is to provide apparatus of the character described which is simple in construction and which may be operated in a rapid, economical and convenient manner.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 3 is a cross-sectional view taken substantially in the plane indicated by line 3—3 of Figure 1.

Figure 4 is a cross-sectional view taken substantially in the plane indicated by line 4—4 of Figure 3.

Figure 5 is a vertical cross-sectional view taken substantially in the plane indicated by line 5—5 of Figure 1.

The apparatus of the present invention is particularly well adapted for use with a pair of axially spaced abrading devices 12 and 13, but as will later be made clear, only a single abrader can be utilized. More specifically, such apparatus is arranged to support a tire, rotate the tire, and be capable of an infinite number of movements relative to the axially stationary abrading devices so as to position selective portions of the tire periphery in contact with said devices.

As here indicated, each of the abrading devices 12 and 13 includes a pair of buffing wheels 14 and 16, the former possessing a relatively rougher grinding surface than the latter. In this manner, both rough and fine buffing operations can be performed without requiring the stopping of the machine. If desired one of the abrading members, for example, 12, could consist solely of a rough buffer, and the other member solely of a fine buffer, for as will be presently explained the tire-supporting portion of the apparatus may be moved adjacent either of the abrasive members.

Figure 1:
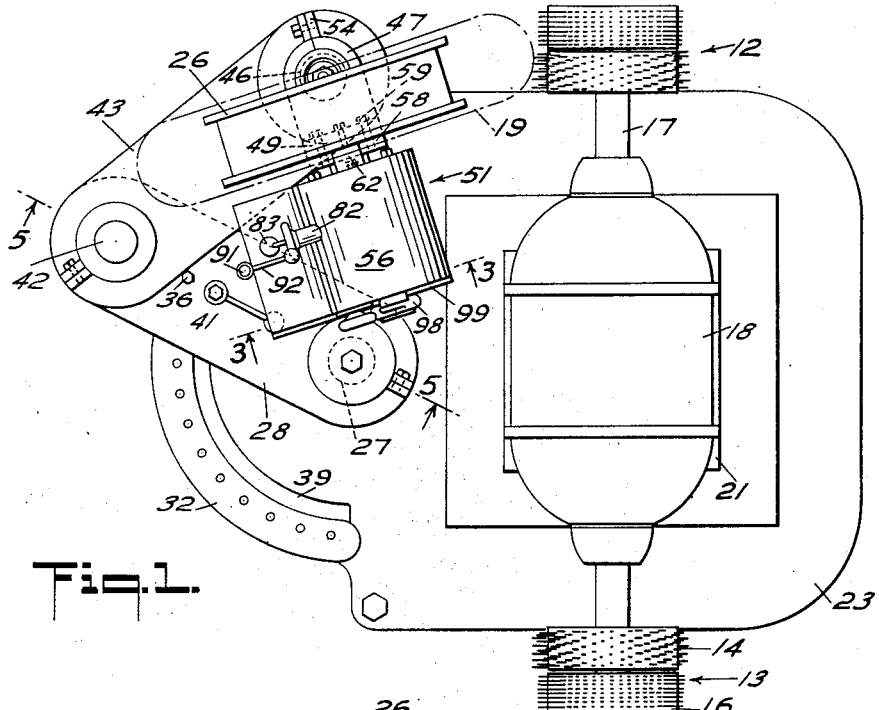
Figure 1 is a top plan view of the apparatus of the present invention.
Figure 2:
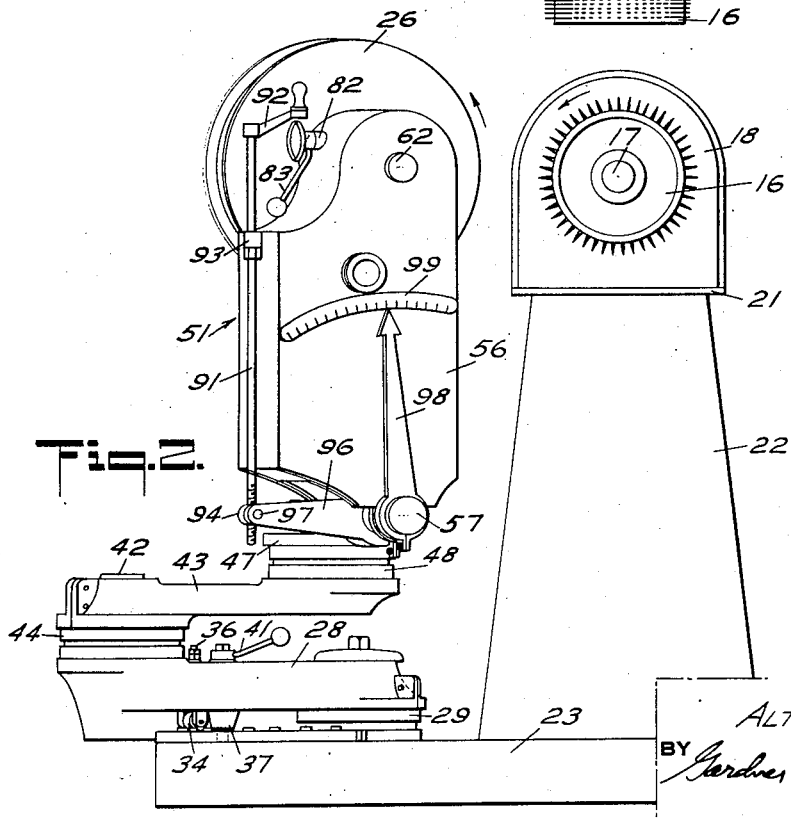
Figure 2 is an end elevational view.

Buffing wheels 14 and 16 are mounted in side by side relation on a horizontal shaft 17 extending axially in both directions from a motor 18, arranged to drive the shaft and wheels in a counterclockwise direction as viewed in Figure 2. As will be later explained and discussed in detail, the tire 19 is rotated in a contradirection to that of the buffing wheels. Motor 18 may be supported on a frame assembly 21 carried on the upper end of a pedestal 22 which in turn is carried on a frame or base 23. This base also serves to support the movable portions of the tire engaging and rotating mechanism which will now be described in detail.

It was previously mentioned that the tire engaging mechanism included a plurality of pivots to permit substantial universal positioning of the tire. The tire 19 is releasably mounted on a hub 26 which, during rotation, is capable of movement about said pivots for proper tire positioning relative to said buffing wheels. For purpose of convenience, the pivotal elements will be discussed in order from the base 23 to the hub 26.

Mounted substantially equidistant from the center of motor 18 on the base 23 is a first vertical pivot shaft 27 whose upper end is disposed above the upper surface of the base. An arm 28 has one end journalled on shaft 27 for free pivotal movement, such movement being facilitated by suitable bearings 29 and 31. The other end of the arm is arranged to roll along an arcuate trackway 32 whose center of curvature coincides with the axis of shaft 27. As will be noted, arm 28 is provided with an intermediate depending portion 33 on which a roller 34 is journalled, an adjustment screw 36 controlling the vertical positioning of the roller axis. In this manner, arm 28 may be readily pivoted in a horizontal plane about the first pivot shaft 27.

Means are provided for releasably clamping arm 28 in any selected position of rotation, such means including a clamp bolt 37 having a head 38 disposed in an arcuate recess 39 underlying a portion of trackway 32. A manually engageable handle and nut assembly 41 threadedly engages the upper end of the bolt and by tightening the same, the head will be forced against the lower surface of trackway 32, and rotation of the arm will be effectively prevented.

The distal end of arm 28 carries a second vertical pivot shaft 42 on which is journalled for rotation one end of a second pivot arm 43, a suitable bearing 44 being interposed between the respective first and second arms. The other end of arm 43 supports a third vertical pivot shaft 46 which rotatably supports a third pivot arm 47 on a bearing 48. As will be noted, arm 47 is relatively short and is provided with a flange 49, such flange being bolted or otherwise secured to the hub supporting and driving mechanism, generally indicated by the numeral 51.

From the foregoing it should be clear that by moving the arms about their respective pivots 27, 42 and 46, the mechanism 51 and hub 26 carried thereby may be moved into numerous positions adjacent either of the abrading devices 12 and 13. It will of course be appreciated that the combined lengths of arms 28 and 43 is greater than the radial distance from pivot shaft 27 to the buffing wheels so that the hub may be brought into tangential relation with such wheels without requiring a full extension of the pivot arms. It will likewise be understood that each of the arms 43 and 47 may be locked in selected positions of rotation in any suitable manner, such as by the split collar assemblies 53 and 54 illustrated in the drawings.

The hub supporting and driving mechanism 51 preferably includes a housing 56 whose lower end is journalled on a horizontal pivot shaft 57. This shaft is provided with an external radial lug 58 which may be releasably attached to flange 49 by bolts 59 or the like. Spaced bearings 61 adjacent the upper end of the housing carry a rotatable horizontal shaft 62 on which hub 26 is mounted. As will be presently described in detail, shaft 62 is power driven to impart rotary movement to the hub and the tire carried thereon.

Disposed within housing 56 is a motor 63 which is connected to a speed reduction box 64 through a belt 66. The driving shaft of the motor is preferably provided with a varispeed pulley 67 whereby change in belt tension will vary the effective output speed of the gear box 64. The tension changes may be simply effected by providing a pulley 68 in engagement with an intermediate portion of the belt 66 which is movable from left to right as viewed in Figure 4. The pulley is journalled in a bracket 69 slidable along rails 71, an axially fixed lead screw 72 being threadedly engaged to the bracket. In this manner, rotation of screw 72 will move pulley 68 away from the belt, decreasing belt tension and reducing the belt speed, and rotation of the screw in a contradirection will result in a reverse effect.

Power is transmitted from gear box 64 to shaft 62 through a pair of sprockets 76 and 77 and a chain 78. Preferably, a conventional clutch assembly 79 is also utilized to selectively permit or prevent transfer of rotary power from sprocket 76 to shaft sprocket 77.

In view of the fact that the housing is tiltable about a horizontal axis defined by first shaft 57 as well as about a plurality of vertical axes, it may be necessary to move hub 26 axially on shaft 62 to insure optimum buffing operations. As an important feature of the invention, means are therefore provided for effecting axial displacement of the shaft 62 and consequently hub 26. Such means are indicated in the drawings as including a form of rack and gear system, such as a plurality of parallel grooves 80 disposed on a portion of shaft 62 engageable by the teeth of a gear 81 having a manually rotatable shaft 82 and operating handle 83. The shaft may be provided with conventional guideways to permit axial movement thereof and by rotating the handle 83, the hub 26 may be selectively moved from and towards the adjacent surface of housing 56, and the tire may be properly positioned, e. g., directly over pivot pin 46.

Means are provided for permitting tilting movement of the housing about horizontal shaft 57 and for retaining the housing in selected positions of pivotal movement. While this may be effected in a variety of ways, I have chosen to use a vertically disposed lead screw 91 provided with a manually engageable handle 92. The screw is supported on a housing bracket 93 and its lower threaded end is engaged with a follower member 94 which is pivotally attached to one end of a bell crank lever 96 by means of a pin 97, the other end of the lever being clamped to shaft 57. By rotating the screw, the entire housing will be pivoted about shaft 57 and the tire caused to advance towards or recede from the buffing wheels. Normally, this pivoting about a horizontal axis will be primarily used for very accurate buffing or truing of the tire, and the degree of tilt will usually be correlated to the tire tread radius. As shown in Figure 2 of the drawings, a fixed pointer 98 may be attached to shaft 57, and a measuring scale 99 placed on a housing wall. The operator can then readily turn screw 91 a measured amount for the subsequent buffing operation.

With the foregoing constructional details explained, the operation of the device may be discussed. A tire 19 is placed on hub 26 and inflated. By moving the arms 28, 43 and 47 about their respective pivot pins, the tread or side wall portions may be brought into adjacent relation with the desired rotating buffing wheel. The tire is rotated by its motor 63 in a direction contra to the rotation of the buffer and may be readily moved so that all peripheral portions thereof may be buffed or trued. In order to get both side wall portions of the tire, it will probably be necessary to rotate arm 47 through 180° and effect a reversal of the motor and hub rotation so that the confronting faces of the buffer and tire, will always be moving in opposite directions. However, it will not be necessary to remove the tire from the hub as is a common practice with many prior art machines. Where very accurate buffing is desired, all of the arms, or at least arms 28 and 43, may be locked or clamped on their respective shafts, and the housing tilted about shaft 57 until the tire engages the buffing wheels, and thus very fine and accurate results may obtain. For normal operations, the arms may be left free and the operator may readily guide the desired tire portions into engagement with the buffing wheels. In most of the tire buffing mechanisms heretofore available, the tire was freely rotatable on its support. However, it has been found that by having independent and selective rotational speeds of tire and buffer, far easier and improved buffing action results.

What is claimed is:

1. Apparatus of the character described including a frame structure, a first vertically disposed shaft carried on said frame, a first arm journalled on said first shaft adjacent one end of said shaft, a second arm, means pivotally connecting an end of said second arm to the other end of said first arm whereby both arms may be moved in substantially horizontal planes, a tire-supporting assembly carried by the other end of said second arm and including a horizontally disposed tire supporting shaft, means for effecting selective axial movement of said horizontal shaft, and means permitting rocking movement of said tire-supporting assembly about a horizontal axis adjacent said second arm.

2. Tire supporting and buffing apparatus including a base, a first horizontally disposed arm pivotally attached to said base, a second horizontally disposed arm pivotally attached to said first arm, a third horizontally disposed arm pivotally attached to said second arm whereby all or selective ones of said arms may be moved in substantially horizontal planes, said second and third arms being rotatable about a complete 360 degree arc, a horizontal tire-supporting axle carried by said third arm, means for rotating said axle, a tire-supporting hub carried on said axle, and buffing means adapted to engage a tire mounted on said hub.

3. Tire supporting apparatus comprising a horizontally disposed platform having a first vertically disposed shaft mounted thereon and an arcuate horizontal trackway having a center of curvature at the axis of said first shaft, a first arm having one end portion journalled on said first shaft and having means thereon rolling along said trackway, a second vertically disposed shaft carried by the other end portion of said first arm, a second arm having one end portion journalled on said second shaft and movable over said first arm, a third vertically disposed shaft carried by the other end portion of said second arm, and a member journalled on said third shaft including a horizontally disposed tire drive shaft spaced vertically above said arms and having a tire hub secured thereto.

4. Tire supporting apparatus comprising a horizontally disposed platform having a first vertically disposed shaft mounted thereon, a substantially planar horizontally disposed first arm having one end portion journalled on said first shaft, a second vertically disposed shaft carried by the other end portion of said first arm, a substantially planar horizontally disposed second arm having one end portion journalled on said second shaft for movement thereof completely over said first arm, a third vertically disposed shaft carried by the other end portion of said second arm, a member mounted for horizontal rotation about said third shaft, said member including a horizontal shaft, a housing journalled on said horizontal shaft, a tire drive shaft journalled on said housing in parallel spaced relation to said horizontal shaft, and means for rocking and retaining said housing about the axis of said horizontal shaft into selected positions of displacement.

5. Apparatus as set forth in claim 4 in which said rocking and retaining means includes a vertically disposed lead screw carried by said housing, a lever carried by said horizontal shaft, and means pivotally interconnecting said lever and rocking movement of said housing.

6. Tire supporting and abrading apparatus comprising a base, a buffing wheel mounted for rotation about a horizontal axis in vertical spaced relation to said base, means for rotating said buffing wheel, a first arm pivotally attached to said base for movement in a horizontal plane, a second arm pivotally attached to said first arm for movement in a horizontal plane, a third arm pivotally attached to said second arm for movement in a horizontal plane, said second and third arms being movable completely over their respective subjacent arms, a horizontally disposed shaft carried by said third arm, a housing pivotally carried on said horizontal shaft, a drive shaft journalled in said housing and lying substantially in the same plane as said buffing wheel axis, said drive shaft having means to mount a tire to be brought against said buffing wheel, and means in said housing for rotating said drive shaft.

References Cited in the file of this patent
UNITED STATES PATENTS

| | | |
|---|---|---|
| 1,848,684 | Woock | Mar. 8, 1932 |
| 2,392,667 | Hawkinson | Jan. 8, 1946 |
| 2,601,810 | James | July 1, 1952 |

FOREIGN PATENTS

| | | |
|---|---|---|
| 601,199 | Great Britain | Apr. 29, 1948 |